United States Patent [19]

Mann

[11] Patent Number: 5,167,291

[45] Date of Patent: Dec. 1, 1992

[54] HYDROSTATIC DRIVE SYSTEM FOR VEHICLES

[75] Inventor: Egon Mann, Friedrichshafen, Fed. Rep. of Germany

[73] Assignee: Zahnradfabrik Friedrichshafen AG, Friedrichshafen, Fed. Rep. of Germany

[21] Appl. No.: 646,602

[22] PCT Filed: Aug. 8, 1989

[86] PCT No.: PCT/EP89/00936

§ 371 Date: Jan. 29, 1991

§ 102(e) Date: Jan. 29, 1991

[87] PCT Pub. No.: WO90/01429

PCT Pub. Date: Feb. 22, 1990

[30] Foreign Application Priority Data

Aug. 11, 1988 [DE] Fed. Rep. of Germany ....... 3827205

[51] Int. Cl.⁵ ...................... B60K 17/14; F16H 39/50
[52] U.S. Cl. ....................................... 180/6.3; 60/466;
137/493; 180/6.48; 180/9.1; 303/84.2

[58] Field of Search .................. 180/9.1, 6.3, 6.48,
180/244, 242; 60/466; 137/493, 493.9;
303/DIG. 1, DIG. 2, 84.1, 84.2

[56] References Cited

U.S. PATENT DOCUMENTS 3,261,645  7/1966  Alfieri et al. ..................... 303/84.2
4,016,903  4/1977  Akashi et al. .................... 137/493.9

Primary Examiner—Mitchell J. Hill
Attorney, Agent, or Firm—Herbert Dubno

[57] ABSTRACT

A hydrostatic drive system for vehicles including a hydromotor with a control unit forming together a drive unit which in the assembled state can be inserted in the seat of the centering device of the drive system, the configuration and arrangement of the wheel brake valve wakes possible to obtain a drive unit with compact dimensions, in axial as well as in radial direction, especially due to the double function of the wheel brake valve which serves simultaneously as a pressure relief valve.

6 Claims, 2 Drawing Sheets

5,167,291

HYDROSTATIC DRIVE SYSTEM FOR VEHICLES

CROSS REFERENCE TO RELATED APPLICATIONS

This application is a national phase application of PCT/EP/00936 filed Aug. 8, 1989 and based, in turn, upon German National Application P3827205.9 filed Aug. 11, 1988 under the International Convention.

FIELD OF THE INVENTION

The invention relates to a hydrostatic drive system for vehicles, particularly crawlers with a hydromotor mounted in the hub of a drive wheel, in or on whose control housing, besides control valves, wheel brake valves are provided, which are arranged in pressure lines and regulate the cross section of the return flow, steering it respectively on and off, depending on the operational pressure of the hydromotor.

BACKGROUND OF THE INVENTION

Hydrostatic drive units for vehicles are known (DE C 2 32 35 378). Thereby, it is required that the drive unit be so compact, especially in the axial direction, that it does not project laterally over the width of a caterpillar track of a crawler excavator or of the wheel of a vehicle. At the same time, the radial dimensions in the area of the seat of the centering device have to be selected so that drive system can be inserted and removed as a completely preassembled unit. These requirements are difficult to meet, when in or on the control housing of the hydromotor wheel brake valves are mounted in addition to other control valves. However, the arrangement of the valves directly on the control housing is advantageous because of increasing the response sensitivity of the drive due to short control lines

OBJECTS OF THE INVENTION

It is the object of the invention to provide a hydrostatic drive system having a particular valves, particularly of the wheel brake valves.

SUMMARY OF THE INVENTION

Due to configuration according to the invention, the wheel brake valves serve simultaneously as a pressure relief valve, so that additional pressure relief valves can be eliminated. This makes possible to keep the dimensions of the control lid with the valves small and to integrate the wheel brake valves in the control lid, so that in the assembled state they can be slid through the seat of the centering device of the drive system.

In order to increase the cross section of the inflow during traction, without increasing the overall construction volume of the wheel brake valves, parallel to each of the wheel brakes valve a bypass line is provided which is equipped with a return valve opening in the direction of the hydromotor. These valves require only a small space and can be lodged in the control lid in suitable places. Further, it is possible to use the same hydromotor with the same control lid for various flow volumes by simply changing the bypass.

In order to sustain the operation of the hydromotor with two pressure lines and one control line, according to the invention the pressure lines on the side of the wheel brake valves facing away from the hydromotor are interconnected by a control line with a two-way valve and a control pressure line for an adjusting mechanism of the hydromotor starting out from this valve.

The wheel brake valve of the drive system of the invention has in the area of the valve seat a throttle gap gradually widening with the opening of the wheel brake valve. As a result, the cross section of the opening can be precisely and continuously controlled over a long control path. Oscillations of the control piston in the area of the closing position are prevented. Further, according to the invention, the control piston has a compensation space with a compensation opening designed as a throttling point in the frontal surface facing the hydromotor. The compensation space is closed by a supporting piston on the frontal side opposite to the compensation opening, the effective cross section of this supporting piston being slightly smaller than the pressure-impacted surface enclosed by the valve seat. As a result, in spite of high system pressures, the compression springs can be designed with small dimensions. Since at opening and closing, through the throttling compensation opening an oil flows out of the compensation space, or flows into it, the movement of the control piston is attenuated, so that no sudden changes occur. A further attenuation of the control piston movements is achieved when the pressure medium for the control of the control piston is supplied or evacuated through a throttling point. Suitably, the connection of the pressure control line is designed as a throttling point.

BRIEF DESCRIPTION OF THE DRAWINGS

In the drawing, an embodiment of the invention is represented. It shows.

The above and other objects, features and advantages will become more readily apparent from the following description. References are being made to the following drawing in which.

SPECIFIC DESCRIPTION

Figure 1:
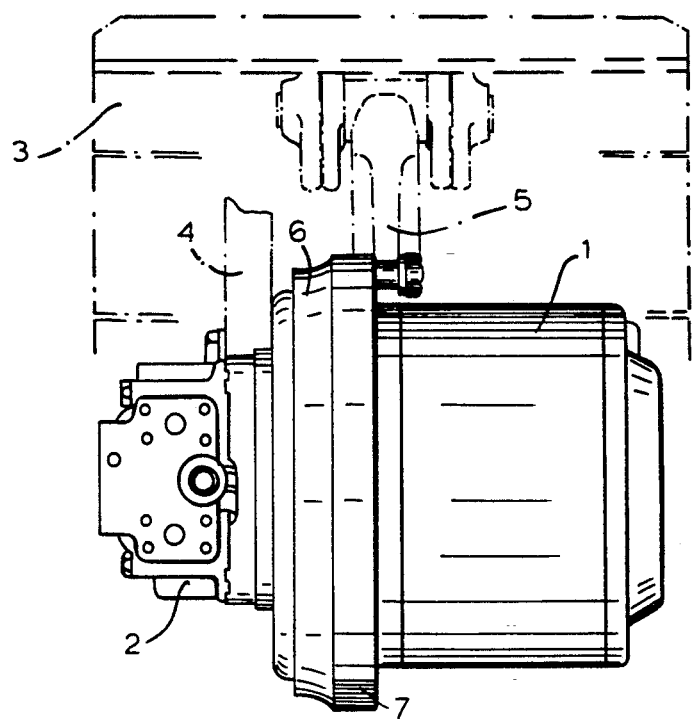
FIG. 1 is a diagrammatical view of an assembled hydromotor with control housing.
Figure 3:
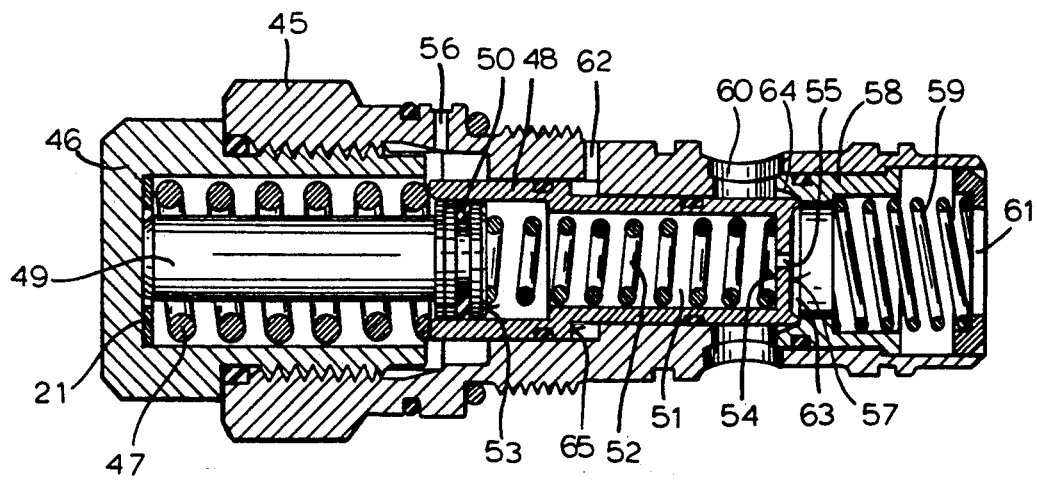
FIG. 3 is a longitudinal cross-sectional view through a wheel brake valve.

A hydromotor 1 is mounted together with a control housing 2 by means of screws to a vehicle frame 4. It drives via a two-stage planetary gear 7 a hub 6 of a drive wheel 5 of a caterpillar track 3. The diameter of the control housing 2 is smaller than the diameter of the seat of a centering device of the drive, so that the assembled drive unit can be inserted from the outside through the seat of the centering device. Two pressure-medium lines 11, 12 (shown in FIG. 3) end in two openings 9 and 10 of the control housing 2.

Figure 2:
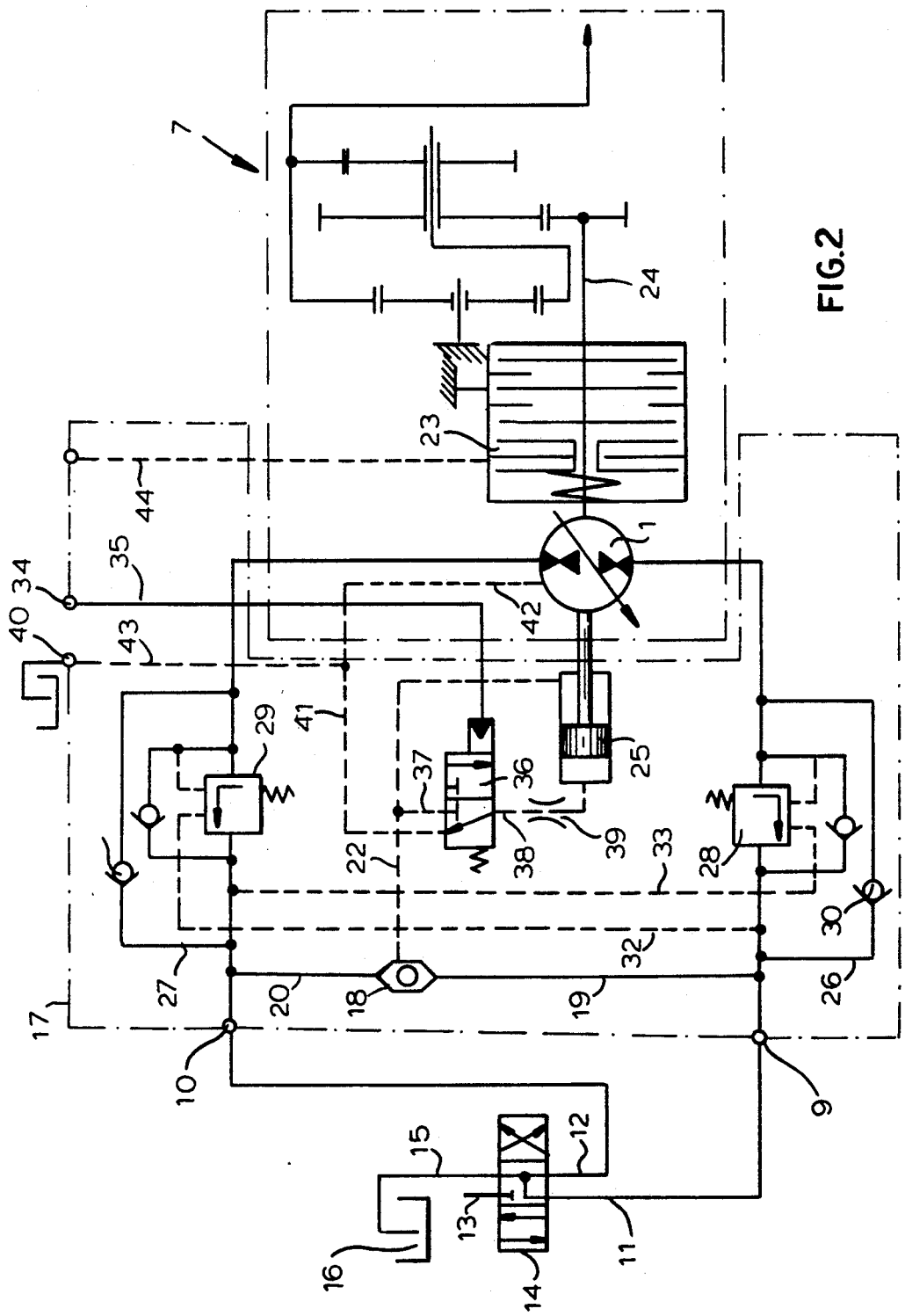
FIG. 2 is a shifting diagram of a hydrostatic drive system according to the invention.

The shifting diagram of FIG. 2 shows clearly the functional interconnection of the pressure-medium lines 11, 12, of the control elements and the hydromotor 1.

An engine drives via a transmission gearing a hydropump (not shown) which supplies a pressure medium via a pressure-medium line 13 to a hydromotor 1. The pressure-medium lines 11, 12, 13 and a return-flow line 15 leading to a tank 16 are regulated by a 4/3 four port, three position valve 14, which in its neutral position closes the pressure-medium line 13 and connects the remaining lines 11, 12 with the return-flow line 15. However, other embodiments are also possible, e.g. wherein in the neutral position the pressure-medium lines 11, 12 are only connected with each other or are selectively closed. In the neighboring positions, the valve 14 actuates one of the two pressure-medium lines 11, 12 with the high pressure source and connects the respective other one with the return-flow line 15. By changing from one neighboring position to the other, the flow through the hydromotor 1 is modified, so that it is driven forward or backward corresponding to the respective open circuit.

The outline of the control housing 2 is symbolized by a dash-dot line 17. It can be seen that after the connection openings 9, 10, the pressure-medium lines 11, 12 run inside the control housing 2 and are at least partially formed by built-in channels. In the control housing 2 a two-position valve 18 is mounted and connected via pressure-medium lines 19, 20 to the pressure-medium lines 11, 12. It also connects the respective pressure-carrying pressure medium line with a control pressure line 22 leading to the two-position adjuster 25 of the hydromotor 1.

In the pressure-medium lines 11, 12, wheel brake valves 28, 29 are mounted. Parallel thereto bypass lines 26, 27 with return valves 30, 31 opening towards the hydromotor 1 are provided. Between the valve 14 and the wheel brake valve 28, a pressure control line 32 leads to the wheel brake valve 29 in the pressure-medium line 12 and from the pressure-medium line 12 a pressure control line 33 leads to the wheel brake valve 28 in the pressure-medium line 11. The wheel brake valves 28, 29 are prestressed in closed direction by springs 47, 52, 59. Shown in FIG. 3.

The pressure-medium lines 11, 12 are alternately supply the medium or discharge the latter from respective ducts of the hydromotor. An output shaft 24 (FIG. 3) of the hydromotor acts upon a parking brake 23, which is prestressed by spring force and is vented when the hydrostatic transmission starts operating through the pressure medium by means of a separate control.

At the control housing 2, there is a connection 34 for a pressure control line coming from outside. From there, a pressure control line 35 leads inside the control housing 2 to an adjusting element of a three parts, two position valve 36, to which are connected the control pressure line 22 via a branch pressure control line 37 and further the two-position adjustment device 25 of the hydromotor 1 via a line 38 and a throttle 39. To an oil sup connection 40 are connected the valve 36 via an oil duct 41, as well as the hydromotor 1 via another oil duct 42 and a collection pipe 43.

A valve housing of the wheel brake valve 28, 29 (FIG. 3) is marked 45. It is closed at one end by a lid 46 which can be screwed on. A thereagainst supported spring 47, can be prestressed to a desired extent by shim plates 21 of various thickness. With its side facing away from the lid 46, the spring 47 rests against a control piston 48. Inside the control piston 48, in a compensation space 51, a supporting piston 49 with a sealing element 50 is contained, which comes to lie against the lid 46 via a cylindrical extension. A compression spring 52 is provided between a frontal surface 53 at the supporting piston 49 and a frontal surface 54 on the control piston 48. The frontal surface 54 of the control piston 48 contains a compensation bore 55 designed as a throttling point and is located between the compensation space 51, wherein the spring 52 is lodged, and the opening 61 towards the hydromotor 1. The housing space, wherein the compression spring 47 is located, is connected via a connection opening 56 to a supply oil duct (not shown) in the control housing 2, so that no additional ducts are necessary outside the control housing.

The end of the control piston 48 facing away from the lid 46 is built as a valve seat 57. The counterpiece 58 of the valve seat 57 is a piston which is guided in the valve housing 45 and presses against a spring 59. The wheel brake valve has two openings 60 and 61 for the passage of the pressure medium. The throughflow is controlled through the pistons 48, 58, which cooperate as a valve. Next to the valve seat 57, a throttle gap 63 is provided, whose cross section gradually grows in size with the increase of the opening, which prevents a pendulation of the control piston between the closed position and the open position. A connection for the pressure control line 32, respectively 33 is marked 62.

DESCRIPTION OF OPERATION

Over two pedals (not shown) the travel speed and the forward or reverse drive ranges are selected. Depending on the drive range, the valve 14 steers the pressure of the adjustable hydropump towards one of the pressure-medium lines 11 or 12. The respective other one of the pressure-medium lines 11 or 12 is connected with the pressure-free return flow line 15. In the neutral position (median position) of the valve 14, both pressure-medium lines 11, 12 are connected with the return-flow line 15.

Further, the description of the operation relates to the position of the valve 14, wherein pressure from the hydropump is transmitted to the pressure-medium line 11 and the pressure-medium line 12 is connected with the pressure free return flow line 15. In the reverse situation of pressure distribution in the pressure-medium lines 11 and 12 in the opposite switch position of the valve 14, the description of the function of the control elements applies correspondingly to the other side.

The pressure medium—hydraulic oil—flows under pressure through pressure-medium lines 11 and the connection opening 9 into the control housing 2. The pressure acts upon the two-way valve 18, which closes the duct 20, for instance by means of a ball, and this allows the pressure to work via control pressure line 22 on the two-position adjusting unit 25, 36 of the hydromotor 1. Further, via the opening 60, the pressure medium acts upon the wheel brake valve 28 and displaces the counterpiece 58 of the control piston 48, against the force of spring 59 of the valve seat 57, thereby opening the wheel brake valve 28, so that through the opening 61 pressure medium flows to the hydromotor 1, actuating the same. A fraction of the flow volume bypasses the wheel brake valve 28 through the bypass line 26 and the return valve 30 to the hydromotor 1.

From the hydromotor 1, the pressure medium flows out over the wheel brake valve 29 and the valve 14 through the pressure-medium line 12 and the return-flow duct 15. The return valve 31 prevents the return flow through the bypass line 27, so that the total flow volume flows through the wheel brake valve 29, which is kept open by the pressure control line 32, as long as the pressure in the pressure-medium line 11 does not drop below a certain determined pressure level. This is due to the fact that the pressure over the pressure control line 32 and over the connection 62 acts upon a recessed piston surface 65 of the control piston 48 of the valve 29. Thereby, the control piston 48 is displaced against the force of springs 47 and 52 and this way separates at the valve seat 57 the control piston 48 from its counterpart 58. The freed valve cross section allows the pressure medium to flow through from the opening 61 on the side of the hydromotor 1 to the opening 60, and from there to the valve 14.

The pressure in the pressure-medium line 11 is sufficient to keep open the wheel brake valve 29 in the pressure-medium line 12, even at very reduced drive outputs of the hydropump.

When during thrust motion the hydromotor 1 is driven by the drive wheel 5 and the pressure drops below a certain value in the pressure-medium line 11, and thereby also in the pressure control line 32, the wheel brake valve 29 moves correspondingly to the pressure drop in closing direction, since the recessed piston surface 65 of the control piston 48 is no longer sufficiently impacted by pressure, so that the control piston 48, under the action of springs 47, 52, throttles the return flow from hydromotor 1 against the counterpiece 58 which also returns towards the closed position. The hydromotor 1 works at this point against the closing wheel brake valve. In case of lacking control pressure (supply pressure) the vehicle is fully stopped. If the return flow continues to rise, the control piston 48 opens in the manner of a pressure relief valve.

Through connection 34, the pressure coming via line 35 from a controllable source outside the control housing 2 acts upon adjustment element of the valve 36. This connects the pressure space of a two-position adjustment unit 25 via a throttle 39 and lines 38 and 41 with a pressure-free discharge oil duct 43.

At a control pressure impact of for instance 30 bar, in the line 35 the positioning device of the value 36 connects the pressure space of the two-position adjusting unit 25 via the lines 37, 38 with the control pressure line 22, whereby the hydromotor 1 is set to a smaller displacement volume. Leak oil from the hydromotor 1 is evacuated through the ducts 42 and 43.

Via a pressure control line 44, the parking brake 23 is vented, namely before the hydrostatic actuation takes effect.

Reference numerals 1 hydromotor
2 control housing
3 caterpillar track
4 vehicle frame
5 drive wheel
6 hub
7 planetary gear
8 seat of centering device
9 connection opening
10 connection opening
11 pressure-medium line
12 pressure-medium line
13 pressure-medium line
14 4/3-way valve
15 return valve
16 tank
17 housing outline
18 two-way valve
19 pressure-medium line
20 pressure-medium line
21 shim plates
22 control pressure line
23 parking brake
24 output shaft
25 two-position adjuster
26 bypass line
27 bypass line
28 wheel brake valve
29 wheel brake valve
30 return valve
31 return valve
32 pressure control line
33 pressure control line
34 connection
35 line
36 3/2-valve
37 line
38 line
39 throttle
40 leak oil connection
41 discharge duct
42 discharge duct
43 discharge duct
44 pressure control line
45 valve housing
46 lid
47 spring
48 control piston
49 supporting piston
50 seal
51 compensation space
52 spring
53 frontal surface
54 frontal surface
55 compensation bore
56 connection bore
57 valve seat
58 counterpiece
59 spring
60 opening
61 opening
62 connection
63 throttle gap
64 frontal side
65 recessed piston surface

I claim:

1. A hydrostatic drive system for vehicles, particularly crawlers, the system comprising:
   a hydromotor mounted in a hub of the drive wheel; and
   control means for controlling a flow of the pressure medium through the hydromotor to provide different modes of the vehicle, the control means comprising:
   a housing mounted on the hub,
   first and second pressure lines for delivering the flow of the pressure medium to and from the hydromotor,
   a control line delivering a control pressure to a pilot valve operatively interconnected with the pressure lines and with the hydromotor,
   first and second wheel brake valves intercepting respective first and second lines in the housing and regulating the cross section of a return flow of the pressure medium from the hydromotor steering it on and off in response to an operational pressure of the hydromotor, each of the brake valves including:
   a valve housing formed with an axial annular bore,
   a control piston slidable axially in the bore between open and close positions of the valve, the control piston being formed with a frontal outer spring-loaded side and an inner opposite side encountering the return flow, the inner side being formed with a narrow annular valve seat, and a counter piston movable axially in the bore, said counter piston extending axially away from the control piston and formed with an annular flange abutting the annular seat in the closed position, the flange and seat forming a throttle gap tapering outwardly toward the frontal side.

2. The drive system defined in claim 1 wherein each of said valves further comprises:

a respective support piston extending axially outwardly from the frontal side in the valve housing, the support piston being formed with an inner end having a continuous contact with the frontal side of the respective control piston;

a compression spring biased between the inner end of the support piston and inner side of the control piston spaced axially outwardly therefrom and forming an axial compensation compartment therewith, and an axial outlet spaced axially inwardly from the inner side and opening toward the hydromotor.

3. The drive system defined in claim 2 wherein each of the valve housing is provided with:

a receiving port receiving the flow and communicating with the respective throttle gap, a connecting port receiving a respective delivery line connected with the respective pressure line for interconnecting the wheel brake valves, each of the control pistons being provided with a respective recessed surface formed between respective frontal and inner sides, the connecting port being spaced axially outwardly from the receiving port and receiving the pressure medium acting upon the respective recessed surface so that the control valve is displaced in the open position of the brake valve, and an oil draining port communicating with the respective compensation compartment for evacuating the pressure medium.

4. The drive system defined in claim 1, further comprising a regulating line interconnecting the pressure lines upstream of the brake valves and intercepted by a two-way valve, the pilot valve being connected with the two-way valve and with a two-position regulator coupled with the hydromotor.

5. The drive system defined in claim 4 wherein the pilot valve and two-position regulator are connected through a throttle valve.

6. The drive system defined in claim 1 wherein each of the brake valves is provided with a respective bypass line intercepted by respective return valve opening in a direction of the flow toward the hydromotor.

* * * * *